United States Patent
Choi et al.

(10) Patent No.: US 10,901,207 B2
(45) Date of Patent: Jan. 26, 2021

(54) APPARATUS FOR PROVIDING HEADS-UP DISPLAY IMAGE

(71) Applicant: SAMSUNG ELECTRONICS CO., LTD., Suwon-si (KR)

(72) Inventors: Yoonsun Choi, Yongin-si (KR); Dong Kyung Nam, Yongin-si (KR); Jinho Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 165 days.

(21) Appl. No.: 16/033,736

(22) Filed: Jul. 12, 2018

(65) Prior Publication Data
US 2019/0235238 A1     Aug. 1, 2019

(30) Foreign Application Priority Data
Jan. 30, 2018 (KR) .................. 10-2018-0011180

(51) Int. Cl.
G02B 27/01 (2006.01)
G02B 5/30 (2006.01)
G02B 27/28 (2006.01)

(52) U.S. Cl.
CPC ....... *G02B 27/0101* (2013.01); *G02B 5/3066* (2013.01); *G02B 27/283* (2013.01); *G02B 2027/0118* (2013.01); *G02B 2027/0194* (2013.01)

(58) Field of Classification Search
CPC ........ G02B 27/0101; G02B 2027/0112; G02B 2027/0114; G02B 2027/0116; G02B 2027/0118; G02B 5/3066; B60K 37/00; B60K 37/02; B60Q 3/10; B60Q 3/14

USPC ................. 359/629–633, 485.01, 485.02
See application file for complete search history.

(56) References Cited

U.S. PATENT DOCUMENTS

| | | | |
|---|---|---|---|
| 5,066,108 A * | 11/1991 | McDonald | G02F 1/133528 349/112 |
| 5,486,840 A | 1/1996 | Borrego et al. | |
| 5,903,396 A * | 5/1999 | Rallison | G02B 27/0101 345/8 |
| 6,744,478 B1 * | 6/2004 | Asakura | G02B 27/0101 349/11 |
| 2002/0048058 A1 | 4/2002 | Nishikawa et al. | |
| 2006/0023315 A1 | 2/2006 | Robinson | |

(Continued)

FOREIGN PATENT DOCUMENTS

| | | | |
|---|---|---|---|
| JP | 2000028957 A * | 1/2000 | |
| KR | 10-1689035 B1 | 12/2016 | |

(Continued)

*Primary Examiner* — Nicholas R. Pasko
(74) *Attorney, Agent, or Firm* — Sughrue Mion, PLLC

(57) ABSTRACT

Provided is an apparatus for providing a heads-up display (HUD) image. The apparatus includes a display configured to emit light with a first polarization, the light including HUD image information, a first wave plate configured to transmit light with a second polarization by shifting a phase of the light with the first polarization by 90 degrees, and a second wave plate configured to transmit light with a third polarization by shifting a phase of a portion of the light with the second polarization by 90 degrees and to reflect another portion of the light with the second polarization toward a user. The light with the third polarization may be transmitted through a windshield.

9 Claims, 5 Drawing Sheets

(56) References Cited

U.S. PATENT DOCUMENTS

| | | | | |
|---|---|---|---|---|
| 2014/0184996 A1* | 7/2014 | Matsushita | ........ | G02B 27/0101 |
| | | | | 349/117 |
| 2016/0363764 A1* | 12/2016 | Ting | ........................ | G02B 5/30 |
| 2017/0052369 A1* | 2/2017 | Shimatani | ........... | G02B 27/0101 |
| 2017/0235030 A1* | 8/2017 | Tanaka | ................. | G02B 5/0816 |
| | | | | 349/11 |
| 2017/0269428 A1* | 9/2017 | Otani | ................. | G02B 27/0101 |
| 2018/0081172 A1* | 3/2018 | Liu | ........................ | B60K 35/00 |
| 2018/0180878 A1* | 6/2018 | Yokoe | .................... | B60K 35/00 |
| 2019/0072766 A1* | 3/2019 | Anzai | ................. | G02B 27/283 |
| 2020/0026073 A1* | 1/2020 | Nambara | ........... | G02B 27/0101 |

FOREIGN PATENT DOCUMENTS

| | | | | |
|---|---|---|---|---|
| WO | WO-2016056617 A1 * | 4/2016 | ............... | G02B 5/26 |
| WO | WO-2016147570 A1 * | 9/2016 | ............. | G02B 27/28 |
| WO | WO-2016208133 A1 * | 12/2016 | ........... | G02B 27/286 |

* cited by examiner

APPARATUS FOR PROVIDING HEADS-UP DISPLAY IMAGE

CROSS-REFERENCE TO RELATED APPLICATION

This application claims priority from Korean Patent Application No. 10-2018-0011180, filed on Jan. 30, 2018 in the Korean Intellectual Property Office, the disclosure of which is incorporated herein by reference in its entirety.

BACKGROUND

1. Field

Apparatuses consistent with exemplary embodiments relate to an apparatus for providing a heads-up display (HUD) image. More particularly, exemplary embodiments relate to a technology for eliminating external light and increasing the brightness of an image.

2. Description of the Related Art

Unlike a heads-down display (HDD) scheme that provides an image to be displayed below a gaze of a driver who is driving, a heads-up display (HUD) scheme provides an image to be displayed in the line of sight of a driver who is driving. An HUD scheme may improve convenience and safety for the driver by minimizing the need to change the gaze of the driver.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments may provide an apparatus for providing a heads-up display (HUD) image that includes a display configured to emit light with a first polarization, the light including HUD image information, a first wave plate configured to transmit light with a second polarization by shifting a phase of the light with the first polarization by 90 degrees, and a second wave plate configured to transmit light with a third polarization by shifting a phase of a portion of the light with the second polarization by 90 degrees and to reflect another portion of the light with the second polarization toward a user.

The light with the third polarization may be transmitted through a windshield.

The light with the third polarization may be incident on the windshield at Brewster's angle.

The first polarization may be a horizontal linear polarization, the second polarization may be a circular polarization, and the third polarization may be a vertical linear polarization.

A windshield and the second wave plate may be combined with each other.

The HUD image providing apparatus further includes a window configured to transmit the light with the first polarization. The window and the first wave plate may be combined.

The HUD image providing apparatus may further include a first mirror positioned to receive the light with the first polarization from the display and to reflect the received light with the first polarization and a second mirror positioned to reflect the light with the first polarization from the first mirror toward the first wave plate.

Another exemplary embodiment provides an HUD image providing apparatus that includes a display configured to emit light with a first polarization, the light including HUD image information, a first wave plate configured to transmit light with a second polarization by shifting a phase of the light with the first polarization by 90 degrees, a polarizing plate configured to transmit light with a third polarization from the light with the second polarization, a second wave plate configured to transmit light with a fourth polarization by shifting a phase of the light with the third polarization by 90 degrees, and a third wave plate configured to transmit light with a fifth polarization by shifting a phase of a portion of the light with the fourth polarization by 90 degrees and to reflect another portion of the light with the fourth polarization toward a user.

The light with the fifth polarization may be transmitted through a windshield.

External light may be transmitted through a windshield, the third wave plate, the second wave plate, and a window, the polarizing plate may be configured to transmit light with a sixth polarization from the external light, the first wave plate may be configured to transmit light with a seventh polarization by shifting a phase of the light with the sixth polarization by 90 degrees, the first wave plate may be configured to transmit light with an eighth polarization by shifting a phase of the light with the seventh polarization that is reflected by a reflector by 90 degrees, and the polarizing plate may be configured to block the light with the eighth polarization.

The light with the fifth polarization may be incident on the windshield at Brewster's angle.

The first polarization may be a horizontal linear polarization, the second polarization may be a circular polarization, the third polarization may be a horizontal or vertical linear polarization, the fourth polarization is a circular polarization, and the fifth polarization is a vertical linear polarization.

The windshield and the third wave plate may be combined with each other.

The HUD image providing apparatus may further include a window configured to transmit the light with the third polarization. The window, the polarizing plate, and the second wave plate may be combined with each other.

The HUD image providing apparatus may further include a first mirror positioned to receive the light with the first polarization from the display and to reflect the light with the first polarization and a second mirror positioned to reflect the light with the first polarization toward the first wave plate.

BRIEF DESCRIPTION OF THE DRAWINGS

The above and/or other exemplary aspects will be more apparent by the following description of certain exemplary embodiments with reference to the accompanying drawings, in which.

DETAILED DESCRIPTION

Figure 1A:
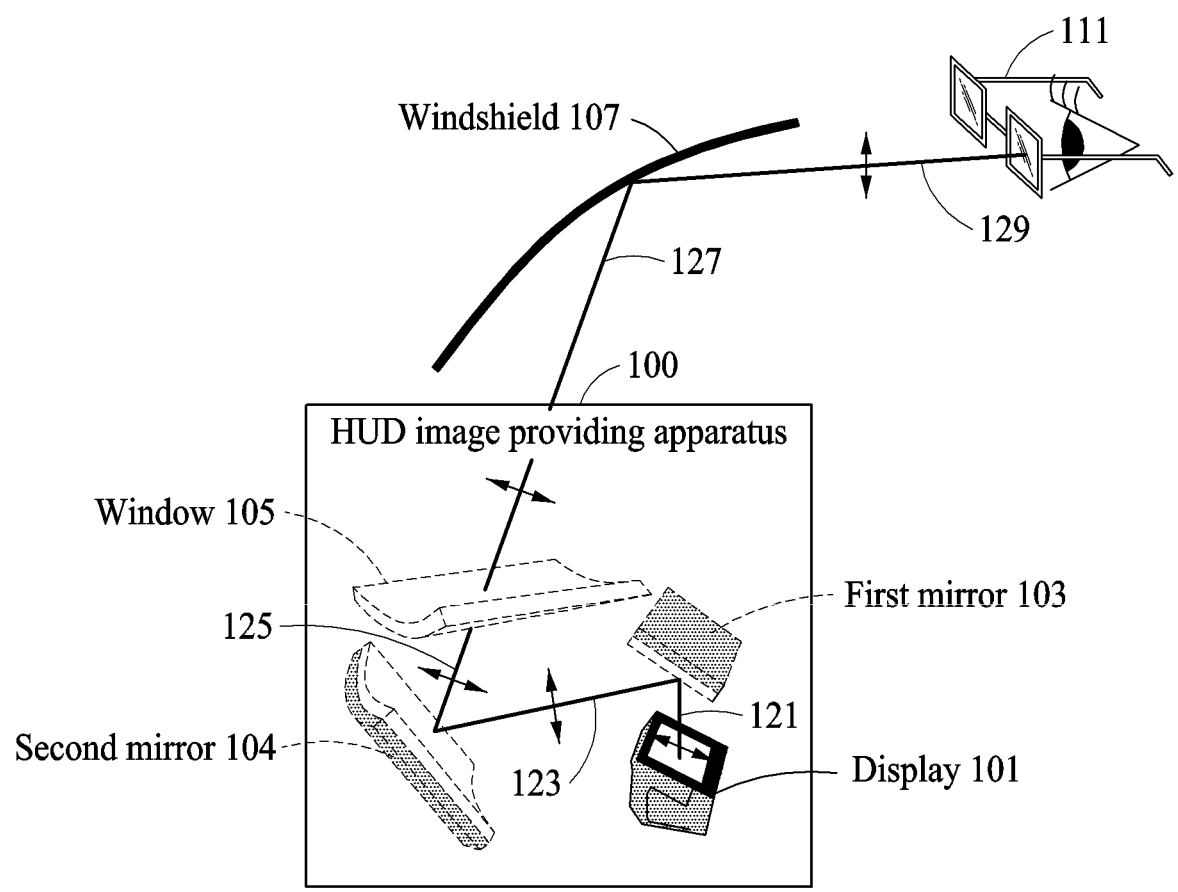
FIG. 1A illustrates a configuration of an apparatus for providing a heads-up display (HUD) image according to an exemplary embodiment.

Reference will now be made in detail to exemplary embodiments which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms are used only to distinguish one component from other component. For example, a "first" component may be referred to as a "second" component, or similarly, and the "second" component may be referred to as the "first" component within the scope of the right according to the concept of the present disclosure.

It should be understood that when a component is referred to as being "connected to" other component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in generally used dictionaries should be construed to have meanings matching with contextual meanings in the related art and are not to be construed as an ideal or excessively formal meaning unless otherwise defined herein.

A function or an operation indicated in a specific block may be performed in a manner different from that indicated by a flowchart if an exemplary embodiment may be differently implemented. For example, two consecutive blocks may be simultaneously performed practically, and may be reversely performed based on a related function or an operation.

Hereinafter, exemplary embodiments will be described with reference to the accompanying drawings. Herein, like reference numerals refer to like elements throughout and a repeated description is omitted here.

FIG. 1A illustrates a configuration of an apparatus (hereinafter, also referred to as a heads-up display (HUD) image providing apparatus) for providing an HUD image according to an exemplary embodiment.

According to an exemplary embodiment, an HUD image providing apparatus 100 may provide an improved luminance using a wave plate that shifts a phase of a polarized light. The HUD image providing apparatus 100 may adjust a phase of polarized light using two or more wave plates. In this way, it is possible to address the issue of the reflectivity decreasing based on an angle of incidence of the light and to prevent a double image from forming. The HUD image providing apparatus 100 may block external light that is reflected within the HUD image providing apparatus 100 by adjusting the phase of the polarized light using three or more wave plates.

An augmented reality (AR) technology is a technology that enables an image to appear as if the corresponding image is present in a real environment by projecting the image onto the real environment. An in-vehicle AR technology is a technology that provides information required while driving by projecting the information onto the real environment. Information of a state of the vehicle, traffic information, navigation information, information of the surrounding environment, and the like may be provided for the driver through such in-vehicle AR technology. An image to be provided may need to be matched to a viewpoint of the driver to increase the appearance of the reality of the image to be provided by the in-vehicle AR technology. An image processing technology that matches the viewpoint of the image to be provided and the viewpoint of the driver, an optical technology that effectively projects the matched image, and the like may be used for a natural matching.

An HUD may be used to provide an AR image in the viewpoint of the driver, naturally and without obstruction. The HUD may be implemented by a projection type device. The projection type device provides an HUD image by projecting the HUD image onto a screen. The projection type device includes a display engine configured to provide HUD image information and the screen onto which the HUD image is projected. The display engine includes a display, a processor configured to operate the display, and a memory configured to store the HUD image information. The display may be a device, for example, a vacuum fluorescent display (VFD), a cathode-ray tube (CRT), a liquid crystal display (LCD), a light-emitting diode (LED), etc. The screen may include a windshield of the vehicle.

AR technology is only an example of a field to which the HUD image providing apparatus 100 is applicable, and the HUD image providing apparatus 100 is not limited thereto.

Referring to FIG. 1A, the HUD image providing apparatus 100 includes a display 101 and at least one wave plate (not shown). The HUD image providing apparatus 100 may include a windshield 107 or may make use of a separate windshield.

The display 101 emits polarized light that includes HUD image information. The display 101 may include an LCD panel. The display 101 may emit the polarized light using the LCD panel. For example, the display 101 may emit light with a horizontal linear polarization or light with a vertical linear polarization. Here, the emitted light includes HUD image information.

The windshield 107 provides an HUD image for a user by reflecting the polarized light. According to another exemplary embodiment, a combiner, rather that the windshield, may be included in the HUD image providing apparatus 100. The combiner may provide an HUD image for the user by reflecting the polarized light.

According to another exemplary embodiment, the HUD image providing apparatus 100 may further include a window 105. The window 105 transmits polarized light. The window 105 may support a wave plate.

The wave plate shifts the phase of the polarized light. The wave plate may be provided at an arbitrary location on a path of the polarized light that is emitted from the display 101. According to an exemplary embodiment, the wave plate may be provided on the windshield 107. The windshield 107 may support the wave plate. The windshield 107 may be combined with the wave plate. According to an exemplary embodiment, the wave plate may be provided on the window 105. The window 105 may support the wave plate. The window 105 may be combined with the wave plate. The HUD image providing apparatus 100 may include at least one wave plate. For example, if at least two wave plates are provided, a first wave plate may be provided on the window 105 and a second wave plate may be provided on the windshield 107.

According to another exemplary embodiment, the HUD image providing apparatus 100 may include a first mirror 103 or the first mirror 103 and a second mirror 104. The first mirror 103 or the second mirror 104 may adjust an angle of reflection of polarized light that is incident thereon so that the polarized light emitted from the display 101 may accurately reach both eyes of the user. The HUD image providing apparatus 100 may further include another mirror in addition to the first mirror 103 or the first mirror 103 and the second mirror 104. The HUD image providing apparatus 100 may further include a lens to zoom in or zoom out an image.

Referring to FIG. 1A, the display 101 includes HUD image information in polarized light and emits the polarized light. The HUD image providing apparatus 100 may adjust a size of an HUD image that is reflected from the windshield 107 by adjusting the light using a lens. When a location and a direction of the display 101 are fixed, the first mirror 103 or the second mirror 104 may adjust a direction, for example, an angle of incidence, of the polarized light that is reflected from the windshield 107 by adjusting a direction, for example, the angle of incidence, of the polarized light. The user may view the polarized light using polarized glasses 111. The user may view the HUD image that is formed as a virtual image on the windshield 107 using the polarized glasses 111.

The wave plate that is combined with the windshield 107 or the window 105 may shift the phase of incident polarized light. For example, the wave plate may shift a phase of polarized light by 90 degrees. In this example, the polarization may include a vertical linear polarization (p polarization), a horizontal linear polarization (s polarization), and a circular polarization. The vertical linear polarization and the circular polarization may be mutually converted by a 90-degree phase shift or a 270-degree phase shift. For example, when the phase of the vertical linear polarization is shifted by 90 degrees, the vertical linear polarization may be converted into the circular polarization. Also, when the phase of the vertical linear polarization is shifted by 270 degrees, the vertical linear polarization may be converted into the circular polarization. When the phase of the circular polarization is shifted by 90 degrees, the circular polarization may be converted into the vertical linear polarization. Also, when the phase of the circular polarization is shifted by 270 degrees, the circular polarization may be converted into the vertical linear polarization. The horizontal linear polarization and the circular polarization may be mutually converted by a 90-degree phase shift or a 270-degree phase shift. For example, when the phase of the horizontal linear polarization is shifted by 90 degrees, the horizontal linear polarization may be converted into the circular polarization. Also, when the phase of the horizontal linear polarization is shifted by 270 degrees, the horizontal linear polarization may be converted into the circular polarization. When the phase of the circular polarization is shifted by 90 degrees, the circular polarization may be converted into the horizontal linear polarization. Also, when the phase of the circular polarization is shifted by 270 degrees, the circular polarization may be converted into the horizontal linear polarization. Therefore, the 90-degree phase shift includes the 270-degree phase shift, and also includes a phase shift of an angle acquired by adding an integer multiple of 360 degrees to 90 degrees or 270 degrees. Hereinafter, the aforementioned description may be applicable to the 90-degree phase shift.

The polarized glasses 111 may transmit a portion of light incident thereon that has a circular polarization or light 129 that has a linear polarization that is the same as a polarization axis of the polarized glasses 111. For example, when the polarization of the light 129 is a circular polarization, a portion of the light 129 that is polarized in the direction of the polarization axis of the glasses 111 may be transmitted through the polarized glasses 111. The polarized glasses 111 may block external light having a polarization perpendicular to the direction of the polarization axis of the polarized glasses 111. The polarized glasses 111 should not have a polarization axis aligned in a direction perpendicular the polarization of the light 129 reflected from the windshield 107.

External light from the sun and the like may be reflected by an object external to the vehicle and may thereby be incident on both eyes of the user. For example, the reflected light may be incident on both eyes of the user if a specific condition is satisfied. When the external light is strong, a dangerous situation may occur. When the external light is reflected by a reflective external object, such as a lake, asphalt, or the like, the reflectivity of light having a horizontal linear polarization may be high, and the reflectivity of light having a vertical linear polarization may be low based on Brewster's law. Accordingly, the polarization eyeglasses 111 may be configured with a vertical linear polarization axis to protect the eyes of the user from the external light.

When the polarized glasses 111 are configured to have a vertical linear polarization axis to block the external light, another issue may arise. The display 101 may emit light 121 having a vertical linear polarization matching the direction of the polarization axis of the polarized glasses 111. When the light 121 is reflected from the first mirror 103, the polarization direction of light 123, that is the reflected light, is not changed. The polarization direction of the light 123 is the vertical direction. The second mirror 104 also does not change the polarization direction of the light 123 that is incident thereon. The polarization direction of the light 125 reflected from the second mirror 104 is vertical.

When a wave plate is not included, the window 105 also does not change the polarization direction of the light 125 that is incident thereon. Therefore, a polarization direction of the light 127 reflected from the window 105 is vertical.

When the wave plate is not included, the windshield 107 does not change the polarization direction of the light 127 that is incident thereon. Therefore, the polarization direction of the light 129 reflected from the windshield 107 is vertical. However, based on Brewster's law, the reflectivity of the light 127 varies based on the angle of incidence of the light 127 on the windshield 107. When the polarization of the light 127 is vertical, the reflectivity of the light 127 approaches zero as the angle of incidence of the light 127 becomes closer to a specific angle. To prevent this, a film that shifts a phase of an incident light by 180 degrees may be used, which may cause an undesirable double image based on the thickness of the film.

According to an exemplary embodiment, the HUD image providing apparatus 100 may enhance the luminance or brightness of the HUD image based on an angle of incidence using the wave plate that shifts the phase of the polarization of light incident thereon. For example, the wave plate may shift a phase of the polarization of the incident light by 90 degrees.

Referring to FIG. 1A, the first wave plate may be combined with the window 105, and the second wave plate may be combined with the windshield 107. The display 101 may emit the polarized light 121. The polarization of the light 121 may be a horizontal linear polarization. The polarized light 121 may be reflected by the first mirror 103 and the second mirror 104. Since the first mirror 103 and the second mirror 104 do not shift the phase of the polarization, the polarization of the reflected light 125 is horizontal. The light 125 may pass through the first wave plate that is combined with the window 105. The first wave plate may shift the phase of the polarization of the light 125 by 90 degrees. Thus, the polarization of the light 127 that is transmitted through the first wave plate may be a circular polarization.

The light 127 may be reflected by the second wave plate that is combined with the windshield 107. The reflected light 129 is not transmitted through the second wave plate and thus, remains circularly polarized. Unlike the vertical linear polarization, the circular polarization may exhibit a reflectivity of 20% or more even when an angle of incidence relative to the windshield 107 is close to Brewster's angle. Since the polarization of the light 129 is circular, the polarized glasses 111 may allow at least a portion of the light 129 to be transmitted to the user's eyes. That is, the phase of a polarization is not shifted by the wave plate. Therefore, the HUD image providing apparatus 100 may provide the user with an HUD image with a relatively high reflectivity as compared to a case in which light with a vertical linear polarization is incident on the windshield 107.

The light 127 may be transmitted through the second wave plate. The second wave plate may shift the phase of the polarization of the light 127 by 90 degrees. the polarization of the light that is transmitted through the second wave plate may be vertical. When the light 127 is incident on the windshield 107 at Brewster's angle, the reflectivity from the windshield 107 may be zero. Thus, it is possible to prevent a double image from forming due to the thickness of the windshield 107.

Also, when the polarization axis of the polarized glasses 111 is vertical, the external light reflected from the external reflector of the vehicle may be blocked because the external light is generally horizontally polarized.

Figure 1B:
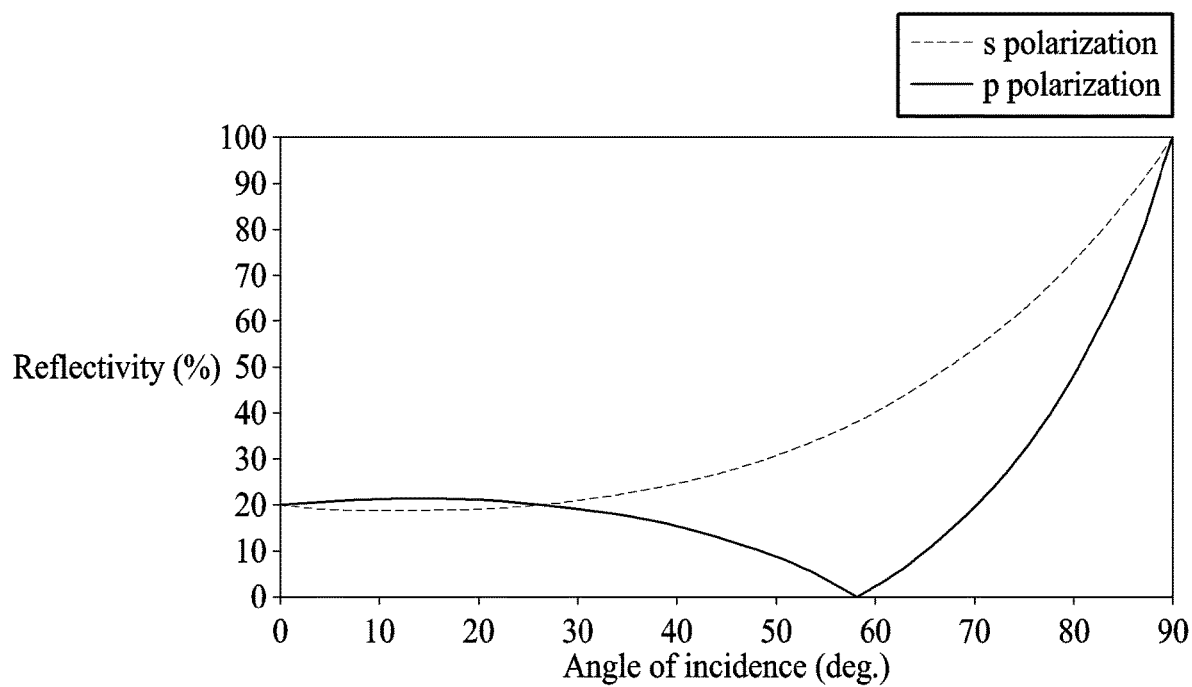
FIG. 1B is a graph showing reflectivity of a particular type of polarization, according to an angle of incidence according to an exemplary embodiment.

FIG. 1B is a graph showing reflectivity of s polarized and p polarized light based on angle of incidence according to an exemplary embodiment.

The reflectivity varies based on the type of polarization when polarized light is incident on glass. As the angle of incidence increases, light with a horizontal linear polarization exhibits an increasing reflectivity. In contrast, as the angle of incidence increases, light with a vertical linear polarization exhibits a decreasing and then increasing reflectivity.

Referring to FIG. 1B, if the angle of incidence of the light with the horizontal linear polarization is zero degrees, the reflectivity is about 20% and the reflectivity becomes closer to 100% according to an increase in the angle of incidence. If the angle of incidence of the light with the vertical linear polarization is zero degrees, the reflectivity is about 20%. If the angle of incidence is between about 49 degrees and about 65 degrees, the reflectivity is less than 10%. If the angle of incidence is about 59 degrees, the reflectivity is 0%. The angle of incidence of which the reflectivity is 0% is referred to as Brewster's angle.

According to an exemplary embodiment, when circular polarization is converted to vertical linear polarization by having the polarization of light incident on the windshield be the circular polarization and by setting an angle of incidence of the light as Brewster's angle, the reflectivity of the light may be 0%. In this way, the HUD image providing apparatus 100 may prevent a double image from forming based on the above principles.

Figure 2:
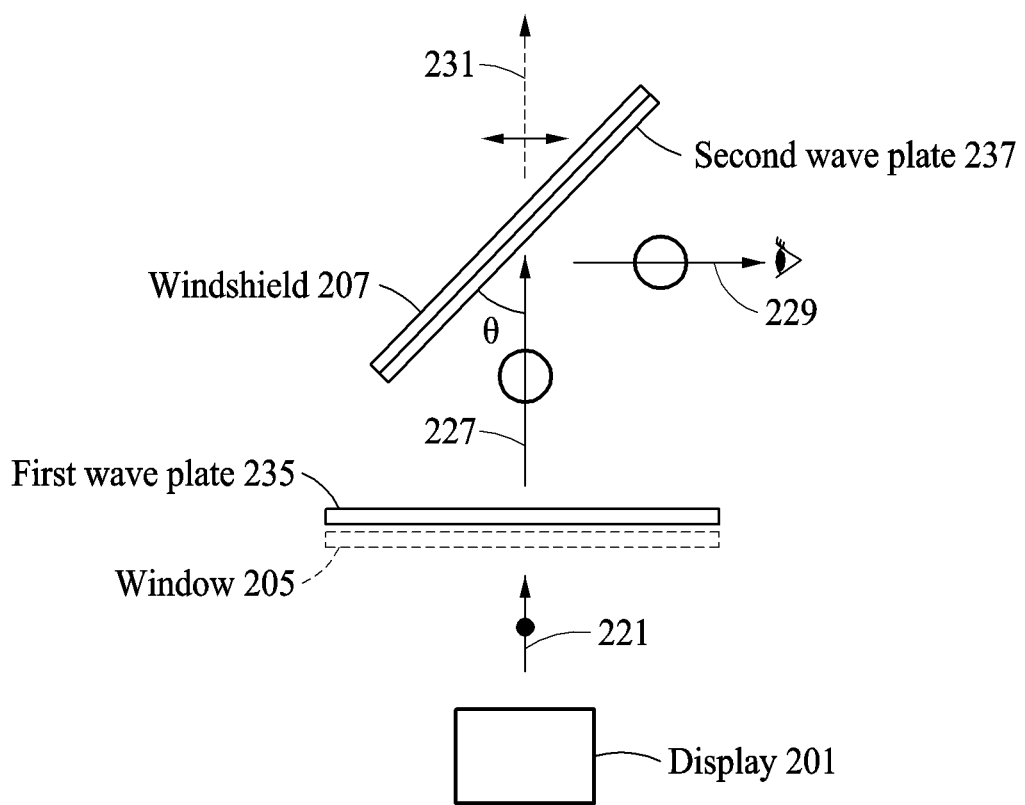
FIG. 2 illustrates a configuration of an HUD image providing apparatus according to an exemplary embodiment.

FIG. 2 is a diagram illustrating a configuration of an HUD image providing apparatus according to an exemplary embodiment.

Referring to FIG. 2, the HUD image providing apparatus 100 may include a display 201, a first wave plate 235, a second wave plate 237, and a windshield 207. The HUD image providing apparatus 100 may further include a window 205. Each of the first wave plate 235 and the second wave plate 237 may be a λ/4 wave plate. The λ/4 wave plate may be a wave plate that shifts a phase of an incident light by 90 degrees.

A user may wear polarized glasses to reduce an intensity of external light that is incident from outside the and thereby directed to the user. The display 201 may emit light 221 with a first polarization. The light 221 includes HUD image information. Here, the display 201 may emit the light 221 with the first polarization corresponding to a polarization axis of the polarized glasses of the user. The user may view the light 221 with the first polarization by wearing the polarized glasses corresponding to a polarization axis of the light 221 with the first polarization. For example, the first polarization of the light 221 may be a horizontal linear polarization.

A direction of the polarization axis of the polarized glasses may be identical to or different from that of the polarization axis of the light 221 with the first polarization. Here, the polarized glasses may allow at least a portion of a light that is incident thereon to be transmitted therethrough when a polarization direction is not perpendicular to the direction of the polarization axis of the polarized glasses. For example, when the light that is incident on the polarized glasses has a circular polarization, a portion of the circular polarization may be transmitted through the polarized sunglasses and thereby may be directed to the user although the direction of the polarization axis of the polarization eyeglasses is a vertical direction.

The window 205 may allow the light 221 with the first polarization to be transmitted therethrough. The window 205 may maintain the first polarization of the light 221. The window 205 and the first wave plate 235 may be combined. The window 205 may support the first wave plate 235. The transmitted light 221 with the first polarization may be incident on the first wave plate 235.

The first wave plate 235 may transmit light 227 with a second polarization by shifting a phase of the light 221 with the first polarization by 90 degrees. The light 227 with the second polarization may be incident on the second wave plate 237. When the light 227 with the second polarization is incident on the second wave plate 237 at Brewster's angle, the reflectivity of the light 227 with the second polarization may be greater than or equal to a threshold value. For example, the threshold value may be less than 20%. For example, the second polarization of the light 227 may be the circular polarization.

The second wave plate 237 may transmit light 231 with a third polarization by shifting a phase of a portion of the light 227 with the second polarization by 90 degrees and may reflect light 229, that is another portion of the light 227 with the second polarization, toward the user. The phase of the portion of the light 227 with the second polarization that is transmitted through the second wave plate 237 may be shifted by 90 degrees, and the light 231 with the third polarization may be transmitted. The light 231 with the third polarization may be incident on the windshield 207 at Brewster's angle. The windshield 207 may transmit the light 231 with the third polarization. The light 231 with the third polarization may be incident on the windshield 207 at Brewster's angle. In FIG. 2, θ denoted Brewster's angle. When the light 231 with the third polarization is incident on the windshield 207 at Brewster's angle, a reflectivity of the light 231 with the third polarization may be 0%. For example, the third polarization of the light 231 may be a vertical linear polarization. Referring to FIG. 1B, when light with the vertical linear polarization is incident on a surface at Brewster's angle, the reflectivity is 0%. Thus, it is possible to prevent a double image from forming due to the thickness of the windshield 207.

Also, when the light 227 with the second polarization is incident on the second wave plate 237 at Brewster's angle, a polarization direction of the light 227 with the second polarization is determined so that a reflectivity of the light 227 with the second polarization may be greater than or equal to the threshold value. Thus, the light 227 with the second polarization may be reflected at a ratio of the threshold value or more. The reflected light 229 may be transmitted to the user. When a polarization of the reflected light 229 is a circular polarization, polarized glasses worn by the user may allow a portion of the light 229 to be transmitted and the user may view the portion of the light 229. At the same time, the polarized glasses may block external light having a polarization axis is different from that of the polarized glasses.

The windshield 207 and the second wave plate 237 may be combined. The windshield 207 may support the second wave plate 237.

The HUD image providing apparatus 100 may further include one or more of a first mirror and a second mirror. The first mirror may receive the light 221 with the first polarization from the display 201 and thereby reflect the received light 221 with the first polarization. The second mirror may reflect the reflected light 221 with the first polarization toward the first wave plate.

Figure 3:
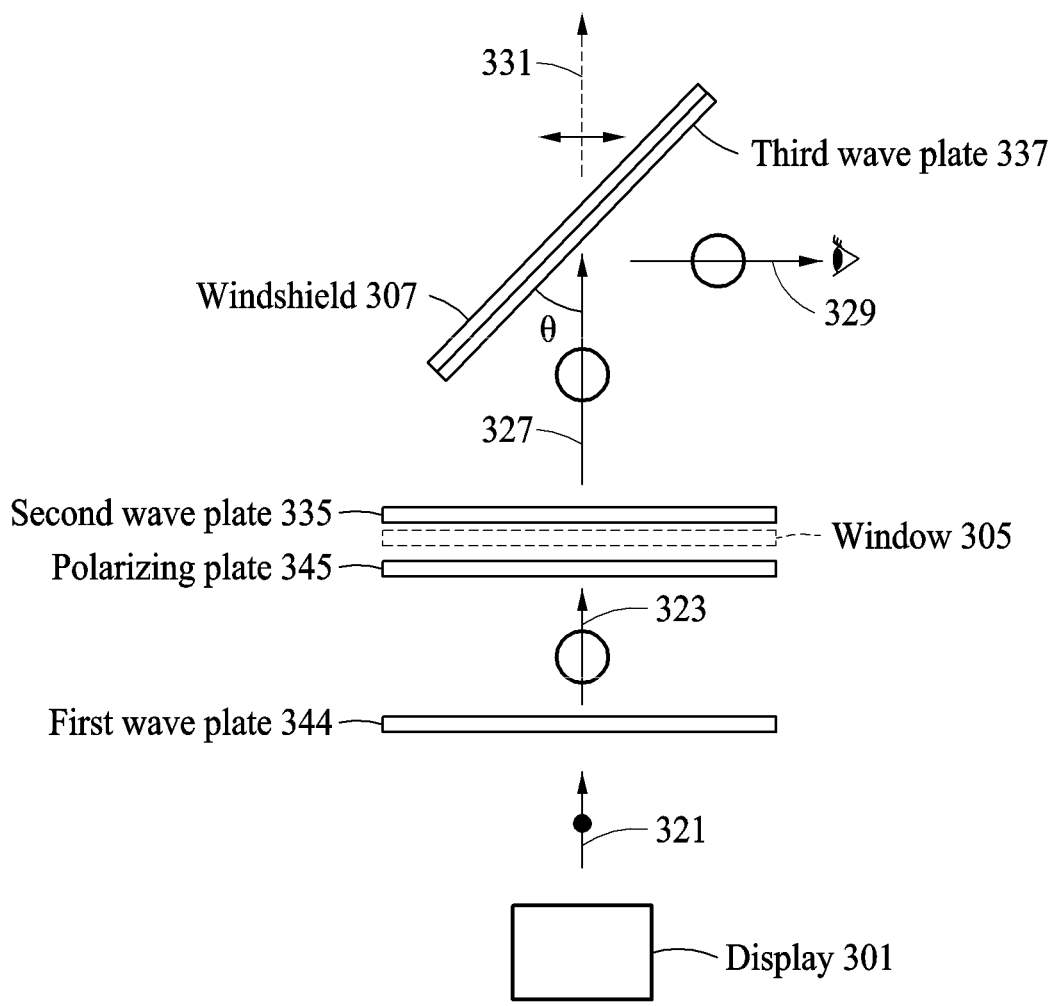
FIG. 3 illustrates a configuration of an HUD image providing apparatus according to another exemplary embodiment.

FIG. 3 illustrates a configuration of an HUD image providing apparatus according to another exemplary embodiment.

According to an exemplary embodiment, the HUD image providing apparatus 100 may include a display 301, a first wave plate 344, a polarizing plate 345, a second wave plate 335, a third wave plate 337, and a windshield 307. Each of the first wave plate 344, the second wave plate 335, and the third wave plate 337 may be a λ/4 wave plate. The polarizing plate 345 may have a polarization axis in a vertical direction or a horizontal direction.

According to another exemplary embodiment, the HUD image providing apparatus 100 may further include a window 305. The window 305 may support the polarizing plate 345 and the second wave plate 335. The polarizing plate 345 and the second wave plate 335 may be combined with the window 305.

The display 301 may emit light 321 with a first polarization. The light 321 includes HUD image information. The display 301 may emit the light 321 with the first polarization to reduce an intensity of external light that is incident from outside of the vehicle and thereby directed to a user. The user may view the light 321 with the first polarization by wearing polarized glasses corresponding to a polarization axis of the light 321 with the first polarization. The first polarization may be a linear polarization.

The first wave plate 344 may transmit light 323 with a second polarization by shifting a phase of the light 321 with the first polarization by 90 degrees. The light 323 with the second polarization may be incident on the polarizing plate 345. The second polarization may be a circular polarization.

The polarizing plate 345 may transmit light with a third polarization by converting the light 323 with the second polarization. The polarizing plate 345 may have a polarization axis in a horizontal direction or a vertical direction. When a light with a circular polarization is incident on the polarizing plate 345, the polarizing plate 345 may transmit the light with the third polarization by allowing a portion of the incident light to be transmitted. The third polarization may be a linear polarization. A polarization axis of the third polarization may be identical to a polarization axis of the polarizing plate 345. The window 305 may transmit the light with the third polarization to the second wave plate 335 by allowing the light with the third polarization to be transmitted therethrough.

The second wave plate 335 may transmit light 327 with a fourth polarization by shifting a phase of the light with the third polarization by 90 degrees. When the third polarization is a linear polarization, the fourth polarization of the light 327 may be a circular polarization.

The third wave plate 337 may transmit light 331 with a fifth polarization by shifting a phase of a portion of the light 327 with the fourth polarization by 90 degrees and may reflect another portion of the light 327 with the fourth polarization toward the user. When the fifth polarization is a vertical linear polarization and, in this instance, the light 331 with the fifth polarization is incident on the windshield 307 at Brewster's angle, a reflectivity of the light 331 at the windshield 307 may be 0%. The windshield 307 may allow the light 331 with the fifth polarization to be transmitted therethrough. Thus, it is possible to prevent a double image from forming due to the thickness of the third wave plate 337. In FIG. 3, θ denotes Brewster's angle.

Also, when the light 327 with the fourth polarization is incident on the third wave plate 337 at Brewster's angle, a polarization direction of the light 327 with the fourth polarization is determined so that a reflectivity of the light 327 with the fourth polarization may be greater than or equal to a threshold value. Thus, the light 327 with the fourth polarization may be reflected at a ratio of the threshold value or more by the third wave plate 337. A reflected light 329 may be transmitted to the user. When a polarization of the reflected light 329 is a circular polarization, the polarized glasses worn by the user may allow a portion of the light 329 to be transmitted and the user may view the portion of the light 329.

At the same time, the polarized glasses may block the external light that has a polarization axis in a direction different from that of the polarized glasses. For example, when a direction of the polarization axis of the external light is a horizontal direction, a direction of the polarization axis of the polarized glasses may be a vertical direction.

For example, a direction of the polarization axis of the polarizing plate 345 may be a horizontal direction. The display 301 may include HUD image information in the light 321 with the first polarization that is a horizontal linear polarization and may emit the light 321. A phase of the light 321 with the first polarization may be shifted by the first wave plate 344 by 90 degrees, and the light 323 with the second polarization may be transmitted. The second polarization may be a circular polarization.

The light 323 with the second polarization may be transmitted through the polarizing plate 345. Since a direction of the polarization axis of the polarizing plate 345 is a horizontal direction and the second polarization is a circular polarization, light with the third polarization that is a horizontal linear polarization may be transmitted while a portion of the light 323 with the second polarization is transmitted through the polarizing plate 345. The light with the third polarization may be transmitted through the second wave plate 335. The second wave plate 335 may transmit the light 327 with the fourth polarization that is a circular polarization by shifting a phase of the light with the third polarization by 90 degrees.

The portion of the light 327 with the fourth polarization may be transmitted through the third wave plate 337 and thereby be incident on the windshield 307. The third wave plate 337 may transmit generate the light 331 with the fifth polarization that is a vertical linear polarization by shifting a phase of the light 327 with the fourth polarization by 90 degrees. As described above with reference to FIG. 1B, when the light 331 with the fifth polarization is incident on the windshield 307 at Brewster's angle, a reflectivity of the light 331 at the windshield 307 may be 0%. The windshield 307 may allow the light 331 with the fifth polarization to be transmitted. Thus, it is possible to prevent a double image from forming due to the thickness of the third wave plate 337.

The another portion of the light 327 with the fourth polarization may be reflected by the third wave plate 337. Also, when the light 327 with the fourth polarization is incident on the third wave plate 337 at Brewster's angle, a polarization direction of the light 327 with the fourth polarization is determined so that the reflectivity of the light 327 with the fourth polarization may be greater than or equal to the threshold value. Thus, the light 327 with the fourth polarization may be reflected at the ratio of the threshold value or more. The reflected light 329 may be transmitted to the user. When the polarization is a circular polarization, polarized glasses worn by the user may allow the portion of the light 329 to be transmitted and the user may view the portion of the light 329.

At the same time, the polarized glasses may block external light that has a polarization axis in a direction different from that of the polarized glasses. When a direction of a polarization axis of the polarized glasses is a vertical direction, the polarized glasses may block external light having a horizontal polarization.

The HUD image providing apparatus 100 may further include one or more of a first mirror and a second mirror. The first mirror may receive the light 321 with the first polarization from the display 301 and thereby reflect the received light 321 with the first polarization. The second mirror may reflect the light 321 with the first polarization toward the first wave plate 344.

Figure 4:
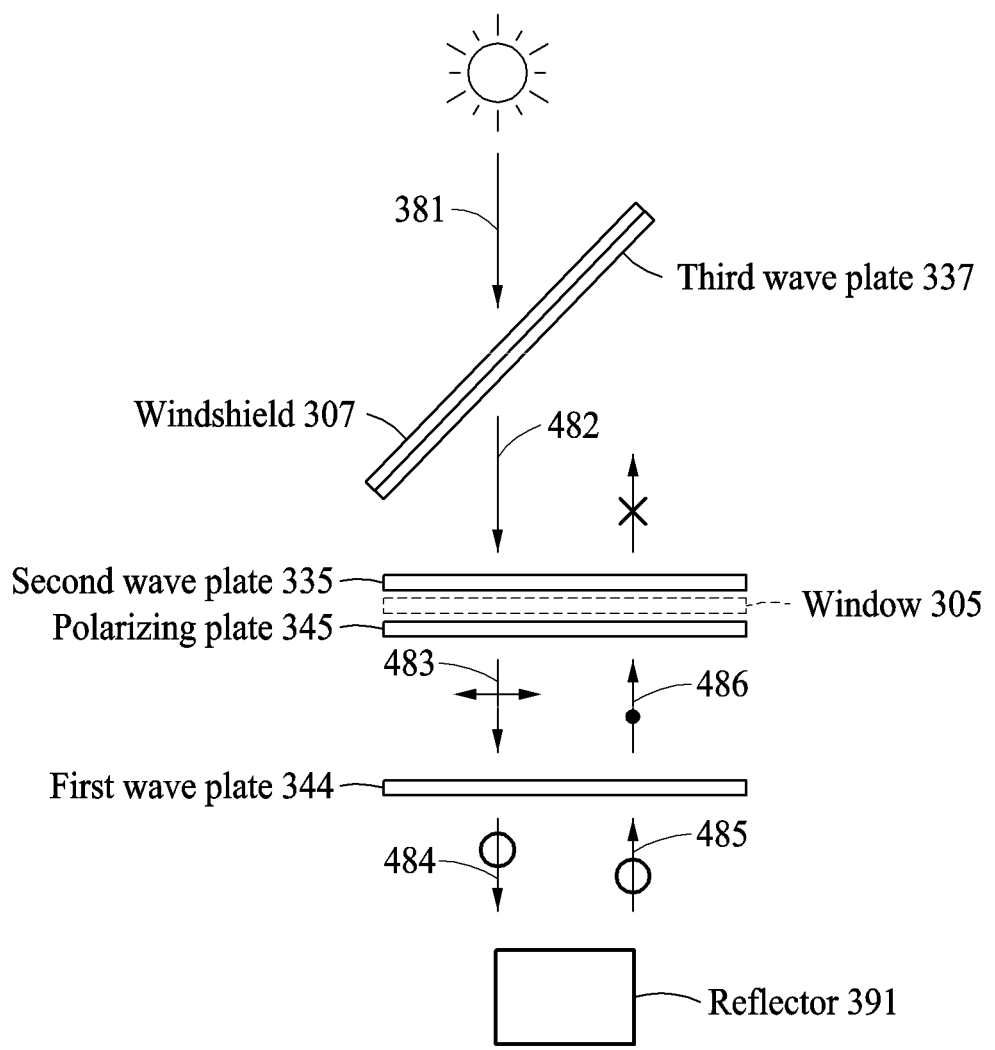
FIG. 4 illustrates an example illustrating an external light blocking effect of an HUD image providing apparatus according to the exemplary embodiment of FIG. 3.

FIG. 4 illustrates an example of an external light blocking effect of the HUD image providing apparatus according to the exemplary embodiment of FIG. 3.

In the exemplary embodiment of FIG. 3, the HUD image providing apparatus 100 may prevent light 381, incident from external of the vehicle, from being reflected by a reflector 391 of the HUD image providing apparatus 100 and thereby transmitted to a user.

The external light 381 may be transmitted through the windshield 307 and the third wave plate 337. The transmitted light 482 may be transmitted through the second wave plate 335 and the window 305. A phase of the external light 381 does not change. Thus, although the external light 381 is transmitted through the third wave plate 337 and the second wave plate 335, a phase of the transmitted light 482 does not change.

The polarizing plate 345 may transmit light 483 with a sixth polarization, when the transmitted light 482 is incident thereon. When a direction of the polarization axis of the polarizing plate 345 is a horizontal direction, the light 483 with the sixth polarization may have a polarization axis in the horizontal direction. When the direction of the polarization axis of the polarizing plate 345 is a vertical direction, the light 483 with the sixth polarization may have a polarization axis in the vertical direction.

The first wave plate 344 may transmit light 484 with a seventh polarization by shifting a phase of the light 483 with the sixth polarization by 90 degrees. The seventh polarization of the light 484 may be a circular polarization. The light 484 with the seventh polarization may be reflected by the reflector 391 of the HUD image providing apparatus 100. For example, the reflector 391 may be the display 301.

The first wave plate 344 may generate light 486 with an eighth polarization by shifting a phase of a light 485 that is reflected by the reflector 391 by 90 degrees. When a direction of the polarization axis of the polarizing plate 345 is a horizontal direction, the light 483 with the sixth polarization may have a polarization axis in the horizontal direction and the light 486 with the eighth polarization may have a polarization axis in a vertical direction. When the polarization axis of the polarizing plate 345 is a vertical direction, the light 483 with the sixth polarization may have a polarization axis in the vertical direction and the light 486 with the eighth polarization may have a polarization axis in the horizontal direction.

When light with a linear polarization that has a polarization axis in a direction perpendicular to a direction of the polarization axis of the polarizing plate 345 is incident on the polarizing plate 345, the polarizing plate 345 may block the incident light with the linear polarization. The polarizing plate 345 may block the light 486 with the eighth polarization. Therefore, the HUD image providing apparatus 100 may prevent external light from being reflected inside the HUD image providing apparatus 100 and thereby interfering with the user's vision.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for providing a heads-up display (HUD) image, the apparatus comprising:
    a display configured to emit light with a first polarization including HUD image information;

a window configured to transmit the light with the first polarization;

a first wave plate provided on the window and configured to transmit light with a second polarization by shifting a phase of the light with the first polarization by 90 degrees; and a second wave plate configured to transmit light with a third polarization by shifting a phase of a portion of the light with the second polarization by 90 degrees and to reflect another portion of the light with the second polarization toward a user, wherein the window is provided between the display and the first wave plate in a path of the light.

2. The apparatus of claim 1, further comprising a windshield, wherein the light with the third polarization is transmitted through a windshield.

3. The apparatus of claim 1, further comprising a windshield, wherein the light with the third polarization is incident on the windshield at Brewster's angle.

4. The apparatus of claim 1, wherein the first polarization is a horizontal linear polarization, the second polarization is a circular polarization, and the third polarization is a vertical linear polarization.

5. The apparatus of claim 1, further comprising a windshield combined with the second wave plate to be directly adjacent to each other.

6. The apparatus of claim 1, wherein the window and the first wave plate are combined to be directly adjacent to each other.

7. The apparatus of claim 1, wherein the second wave plate is provided between a windshield and the first wave plate in the path of the light.

8. The apparatus of claim 1, further comprising:

a first mirror positioned such that the light with the first polarization emitted from the display is incident thereon and configured to reflect the light with the first polarization; and a second mirror positioned to reflect the light with the first polarization from the first mirror toward the first wave plate.

9. The apparatus of claim 8, wherein the window is positioned between first wave plate and the first and second mirrors in the path of the light.

* * * * *